March 12, 1968    M. C. ZIEMKE ET AL    3,372,588
CONSTANT TEMPERATURE HEAT SINK FOR CALORIMETERS
Filed Jan. 28, 1965    2 Sheets-Sheet 1

INVENTORS
MYRON C. ZIEMKE
REX S. ZERGER
BY
ATTORNEYS

March 12, 1968     M. C. ZIEMKE ET AL     3,372,588
CONSTANT TEMPERATURE HEAT SINK FOR CALORIMETERS
Filed Jan. 28, 1965     2 Sheets-Sheet 2

INVENTORS
MYRON C. ZIEMKE
REX S. ZERGER
BY
ATTORNEYS

United States Patent Office 3,372,588
Patented Mar. 12, 1968

3,372,588
CONSTANT TEMPERATURE HEAT SINK FOR CALORIMETERS
Myron C. Ziemke, Huntsville, Ala., and Rex S. Zerger, Houston, Tex., assignors to the United States of America as represented by the Administrator of the National Aeronautics and Space Administration
Filed Jan. 28, 1965, Ser. No. 428,887
4 Claims. (Cl. 73—190)

ABSTRACT OF THE DISCLOSURE

A calorimeter having a heat sink with a cavity filled with a material, such as Glauber's salts, that absorbs heat by transformation so as to maintain the temperature of the heat sink substantially constant.

---

Figure 1:
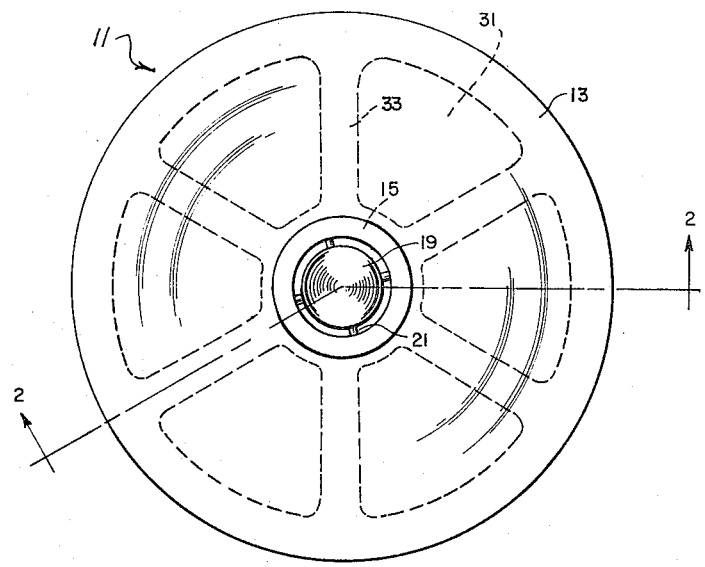

This invention relates to calorimeters and more particularly to calorimeters affected by heat sinks.

With the development of rocket boosters and reentry vehicles, there has been an increasing need for simple, reliable calorimeters that permit accurate measurement of heat flux at various locations and under a variety of conditions. For example, heat flux measurements on the nose cone and leading edges of a vehicle are required to verify basic design criteria during re-entry or exit from the earth's atmosphere. Also as the most critical area of heating on any rocket is the region adjacent the rocket exhaust, it is important to know the magnitude of heating in this region so measures may be taken to provide thermal protection of the various nozzle components.

One type of calorimeter which is simple, compact, and rugged for this type application is the slug calorimeter. It relates the rate of heat transfer to a thermally isolated mass of known constant thermal capacity and the time derivated of the temperature history for the slug at any given instant.

A drawback of the slug calorimeter is that it is impossible to attain complete thermal isolation of the slug sensor and it exchanges heat with its suspensions and mounting flange, i.e. its secondary heat sink. As a result of these conditions, the temperature of the slug suspension varies during the operation of the calorimeter, and this variation can neither be predicted or compensated for during calorimeter calibration.

Another type of calorimeter which is also simple and inexpensive and gives a signal directly proportional to the incident heat flux is the membrane calorimeter. In the membrane calorimeter, also called the Gardon gage after its originator, a thin metallic foil is suspended over a cavity in a heat sink and thermally and electrically bonded to the heat sink at the periphery of the cavity. By making the foil from a thermoelement material such as constantan and the heat sink of copper and by attaching a fine copper wire to the center of the foil, a differential thermocouple is formed having the hot and cold junctions at the foil center and periphery respectively. The temperature difference between the center and the periphery of the foil is directly proportional to the incident heat flux over the foil surface.

A drawback of the membrane calorimeter is that since the temperature of the heat sink rises unpredictably with heat flux and time, the output signal does not reveal the operating temperature of the membrane sensor. Furthermore, if the membrane temperature rises high enough, the signal output of the calorimeter will not be directly proportional to the incident radiant heat flux because of re-radiation effects. While these problems could be solved by installing a second thermocouple in the heat sink or by providing a heat sink cooling system, neither solution is desirable for lightweight or flight type instruments.

Accordingly, it is an object of the present invention to increase the accuracy of calorimeters by eliminating the effect of a variable temperature primary or secondary heat sink.

This and other objects are accomplished by having a self-contained constant temperature heat sink. Thus, the heat exchange between the sensor and heat sink, primary or secondary, at any temperature may be readily predicted. The laboratory calibration data would thereby be valid for all operating conditions.

In the present invention, the heat sink, primary or secondary, is integrated with a material that absorbs heat at a constant temperature. Such a substance can be chosen so that the transition temperature is slightly above the normal expected initial operating temperature of the calorimeter. When the calorimeter begins to absorb heat, the heat sink material will heat up a few degrees to reach the transition temperature and then melt, or decompose, absorbing heat at a constant temperature until all the material is transformed.

Figure 2:
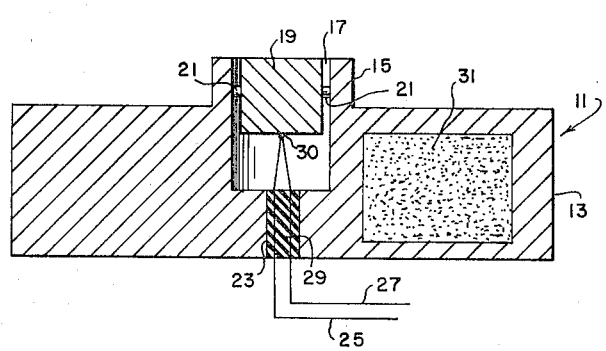
Figure 3:
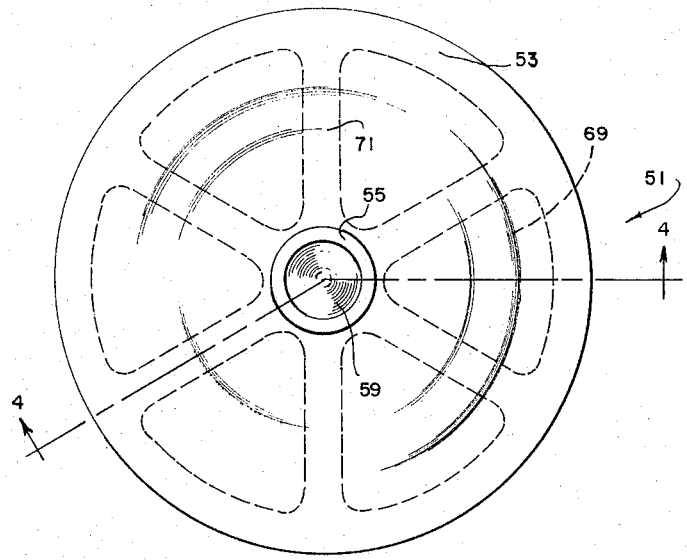
Figure 4:
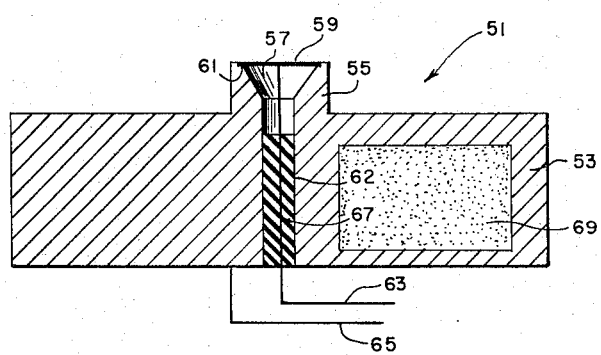

This will be more readily understood by the following detailed description of the invention when taken together with the accompanying drawings, in which:

FIGURE 1 is a plan view of a slug-type calorimeter;
FIGURE 2 is an elevational cross-sectional view taken along line 2—2 of FIGURE 1.
FIGURE 3 is a plan view of a membrane type calorimeter; and
FIGURE 4 is an elevational cross-sectional view taken along line 4—4 of FIGURE 3.

Referring now to FIGURES 1 and 2 which illustrate a slug-type calorimeter 11 having a housing 13 serving as a constant temperature secondary heat sink.

The housing 13 is circular and has a raised annular shoulder 15 about its center forming a circular recess 17 for the slug sensor 19. The slug sensor 19 is suspended within the circular recess 17 by small spaced hollow tubes 21 to thermally isolate the sensor 19 from its housing 13. However, because thermal isolation is difficult, the slug sensor 19 still loses heat through its suspension to the housing. Thus, the housing 13 serves as a secondary heat sink.

A small hole 23 extends out from the bottom of the circular recess 17 and serves as an entrance for the leads 25 and 27 which are connected together to form a thermocouple bead 30. The leads 25 and 27 are formed of suitable thermocouple materials, such as iron and constantan.

The bead 30 is attached to the sensor to form a good heat transfer connection therewith. The hole 23 is filled with a potting compound 29, such as Stycast, to keep the leads 25 and 27 properly spaced from each other.

The housing or heat sink 13 has a plurality of internal cavities 31 separated by radially extending internal ribs 33. Within the cavities 31 is placed a material that absorbs heat at a constant temperature. One such suitable material is Glauber's Salts ($NA_2SO4$-$10H_2O$) which will absorb 25 times as much heat per pound as solid copper allowed a 20° F. temperature rise.

FIGURES 3 and 4 of the drawing illustrates a membrane type calorimeter 51 having a constant temperature primary heat sink 53.

The primary heat sink 53 is circular and has a raised annular shoulder 55 about its center forming an upper cone shaped recess 57. The membrane sensor 59 rests upon a small ledge or cut-out 61 formed by a counter-bore hole at the upper portion of the cone recess 57.

The membrane sensor 59 is a thin metallic foil, and is thermally and electrically bonded to the surrounding raised shoulder 55 of the primary heat sink 53.

A small hole 62 extending from the bottom of the cone recess 57 serves as the entrance for a small lead wire 63 which is attached to the center of the foil 59. Another small lead wire 65 is attached to the primary heat sink 53.

A suitable potting compound 67, e.g. Stycast, fills the hole 62 to keep the lead 63 properly spaced from the heat sink 53.

The primary heat sink 53 is provided with a plurality of internal cavities 69 separated by radially extending internal ribs 71. Within the cavities 69 is a material that absorbs a large amount of heat at a constant temperature, e.g. Glauber's Salts.

The materials that make up the lead wire 63 and heat sink 53, and the membrane 59 respectively, are such that they make up a thermocouple pair. For example, the membrane 59 could be made of constantan and the heat sink 53 and lead wire 63 could be made of copper.

The resulting output signal through the lead wires 63 and 65 is proportional to the temperature differential maintained between the center of the membrane 59 and the heat sink 53. Heat is absorbed by the membrane 59 and flows to the heat sink 53.

Thus, it is apparent to those skilled in the art that a self-contained constant-temperature heat sink has been provided for calorimeters to achieve improve calorimeter accuracy while eliminating any need to measure the heat sink temperature or to provide external cooling of the heat sink.

Obviously, many modifications and variations of the present invention are possible in light of the above teachings. It is, therefore, to be understood that within the scope of the appended claims the invention may be practical other than as specifically described.

What is claimed is:
1. In a calorimeter, the improvement comprising:
   (a) a small slug adapted to both sense and store the net absorbed heat;
   (b) a housing adapted to act as a secondary heat sink;
   (c) said housing having a surface recess for the reception of said slug therein;
   (d) means for suspending said slug within said surface recess cavity;
   (e) said housing also having an internal cavity filled with a material that absorbs heat at a transformation temperature so as to maintain the temperature of the heat sink substantially constant.

2. A combination according to claim 1 wherein said heat absorbing material is Glauber's Salts.

3. In a calorimeter, the improvement comprising:
   (a) a primary heat sink having a surface recess cavity therein;
   (b) a thin metallic foil joined at its periphery to the sides of said surface recess cavity;
   (c) a lead wire attached to the bottom side of said metallic foil and another lead wire attached to said heat sink;
   (d) said heat sink, metallic foil, and lead wires being made of materials to form a differential thermocouple having the hot and cold junctions at the foil center and periphery, respectively.
   (e) said heat sink also having an internal cavity therein filled with a material that absorbs heat at a transformation temperature so as to maintain the temperature of the heat sink substantially constant.

4. A combination according to claim 3 wherein said heat absorbing material is Glauber's Salts ($NA_2SO_4 \cdot 10H_2O$).

References Cited
UNITED STATES PATENTS

| | | | |
|---|---|---|---|
| 2,640,357 | 6/1953 | Stephenson | 73—361 |
| 2,982,132 | 5/1961 | Mendlowitz | 73—190 |
| 3,123,996 | 3/1964 | Musial | 73—15 |
| 3,280,626 | 10/1966 | Stempel | 73—190 |

JAMES J. GILL, *Primary Examiner.*

E. E. SCOTT, *Assistant Examiner.*